United States Patent [19]
Gaddis

[11] Patent Number: 5,956,337
[45] Date of Patent: *Sep. 21, 1999

[54] ATM SWITCH INTERFACE

[75] Inventor: Michael E. Gaddis, St. Louis, Mo.

[73] Assignee: Washington University, St. Louis, Mo.

[ * ] Notice: This patent is subject to a terminal disclaimer.

[21] Appl. No.: 08/562,124

[22] Filed: Nov. 22, 1995

Related U.S. Application Data

[63] Continuation of application No. 08/113,854, Aug. 30, 1993, Pat. No. 5,524,113.

[51] Int. Cl.[6] .................................................. H04L 12/56
[52] U.S. Cl. .......................................... 370/395; 370/419
[58] Field of Search .................................. 370/54, 55, 56, 370/60, 60.1, 94.2, 94.3, 85.1, 85.9, 85.13, 85.14, 85.15, 389, 392, 395, 396, 397, 401, 402, 357, 353, 440, 420, 421, 419, 535

[56] References Cited

U.S. PATENT DOCUMENTS

| | | |
|---|---|---|
| 4,701,910 | 10/1987 | Ulug . |
| 5,001,707 | 3/1991 | Kositpaiboon et al. . |
| 5,008,881 | 4/1991 | Karol . |
| 5,101,404 | 3/1992 | Kunimoto et al. . |
| 5,119,370 | 6/1992 | Terry . |
| 5,140,585 | 8/1992 | Tomikawa . |
| 5,150,356 | 9/1992 | Tsutsui ..................................... 370/535 |
| 5,189,668 | 2/1993 | Takatori et al. . |
| 5,303,231 | 4/1994 | Shinomiya et al. . |
| 5,311,501 | 5/1994 | Takatsu ............................... 340/825.03 |
| 5,323,389 | 6/1994 | Bitz et al. . |
| 5,341,376 | 8/1994 | Tamashita ............................... 370/466 |
| 5,408,469 | 4/1995 | Opher et al. ............................... 370/60 |
| 5,444,700 | 8/1995 | Martikainen et al. ..................... 370/60 |
| 5,524,113 | 6/1996 | Gaddis .................................... 370/60.1 |

OTHER PUBLICATIONS

Optical Coherence Multiplexing for Interprocessor Communications; Chu, K.W. et al.; Performing Organization: Sandia National Labs., Albuquerque, NM; Report No. SAND–89–0220C; CONF–8909177–1; Sponsoring Organization: Department of Energy, Washington, D.C.; Contract No. AC04–76DP00789; 1989; pp. 13p; Abstract.

Study of Wavelength Division Multiplexing as a Means of Increasing the Number of Channels in Multimode Fiber Optic Communication Links; Bates, H.; Performing Organization: Towson State Univ., Baltimore, MD, Dept. of Physics; Sponsoring Organization: National Aeronautics and Space Administration, Washington, DC; Contract No. NGT–6002; Sep. 1990; pp. 36p; Abstract.

(List continued on next page.)

*Primary Examiner*—Chau Nguyen
*Attorney, Agent, or Firm*—Howell & Haferkamp, L.C.

[57] ABSTRACT

An interface device for an ATM network permits a plurality of ATM devices to be connected to a single ATM switch port. The interface device, in its preferred embodiment, is a modular device which may be interconnected to form a system having various segment arrangements to suit the system operational requirements. Each interface device may include a switch side connector, extension side connector, and a device side connector all on a single card with the interface device being configured in VSLI architecture, and multiple interface devices interconnected to construct the system segments. In an alternate application, the interface device may be used to replace the computer backplane and provide direct connection between a computer's system components and an ATM network. In still another configuration, the interface device may itself be utilized to interconnect a plurality of computers to form a local area network. In still another application, the interface device may be used to loop back data to an ATM device prior to transmission of the ATM data onto an ATM network.

29 Claims, 10 Drawing Sheets

OTHER PUBLICATIONS

High Speed, Long Distance, Data Transmission Multiplexing Circuits; Patent Application; Mariotti, R.; Performing Organization: Brookhaven National Lab., Upton, NY; Report No. PAT–APPT–7–472 546; Sponsoring Organization: Department of Energy, Washington, DC; Contract No. AC02–76CH00016; Filed Jan. 30, 1990; pp. 67p; Abstract.

ASIC Technology Applied to SONET Multiplex, Transmission, and Cross–Connect Equipment; McDonald, M.A.; Corporate Source: Rockwell International, Richardson, TX; Conference Title: Proceedings of the IEEE 1991 Custom Integrated Circuits Conference, May 12–15, 1991; Conference Sponsor: IEEE Electron Devices Soc: IEEE Solid–State Circuits Council; IEEE Rochester Section; 1991; pp. 6p; Abstract.

Fairness Problems at the Media Access Level for High–Speed Networks; Maly, K.J. et al.; Performing Organization: Old Dominion Univ., Norfolk, VA; Sponsoring Organization: National Aeronautics and Space Administration, Washington, DC; Contract No.: NAG1–908: CIT–RF–89–002–01; May, 1990; pp. 29p; Abstract.

Data Multiplexing Network (DMN), Phase 3: Equipment Operational Test and Evaluation (OT and E)/Integration Test Plan; Bell, W.; Performing Organization: Federal Aviation Administration Technical Center, Atlantic City, NJ; Report No. DOT/FAA/CT–TN91/24; Sponsoring Organization: National Aeronautics and Space Administration, Washington, DC; Oct. 1991; pp. 64; Abstract.

Data Multiplexing Network (DMN) Phase 3 Equipment Operational Test and Evaluation (OT and E)/Integration Test Report; Bell, W.E.; Performing Organization: Federal Aviation Administration Technical Center, Atlantic City, NJ; Report No. DOT/FAA/CT–TN91/50; Sponsoring Organization: National Aeronautics and Space Administration, Washington, DC; Dec. 1991; pp. 123p.; Abstract.

Starnet: An Integrated Services Broadband Optical Network With Physical Star Topology; Poggiolini, P. et al.; Performing Organization: Stanford Univ., CA, Dept. of Electrical Engineering, Contract No. N00014–91–J–1857; 1991; pp. 16p; Abstract.

Starnet: A MultiGbit/s Optical Local Area Network With Both Packet and Circuit Switching; Kazovsky, L. et al.; Performing Organization: Stanford Univ., CA, Dept. of Electrical Engineering; Contract No. N00014–91–J–1857; 1991; pp. 5p; Abstract.

High Speed Hardware Development for FDMA/TDM System; Kwatra, S.C. et al.; Performing Organization: Toledo Univ., OH; Sponsoring Organization: National Aeronautics and Space Administration, Washington, DC; Contract No. NAG3–799; NAG3–865; Feb. 1991; pp. 10p; Abstract.

Fair Access of Multi–Priority Traffic to Distributed–Queue Dual–Bus Networks; Hahne, E.L. et al.; Corporate Source: AT&T Bell Lab, Murray Hill, NJ; Conference Title: Proceedings of the 10th Annual Joint Conference of the IEEE and Communications Societies—IEEE INFOCOM '91; Conference Location: Bal Harbour, FL, Apr. 7–11, 1991; Conference Sponsor: IEEE Computer Soc.; IEEE Communications Soc.; Abstract.

Metropolitan Area Network (MAN) High Speed LAN Interconnection; Buhmann, A.; Corporate Source: Dipl–Inform; Conference Title: Proceedings of the 5th European Computer Conference on Advanced Computer Technology, Reliable Systems and Applications—CompEuro 91; Conference Location: Bologna, Italy; May 13–16, 1991; Conference Sponsor: IEEE Computer Soc.; Assoc Elettrotecnica ed Elettonica Italiana; pp. 191–194; Abstract.

Dyanmic Bandwidth Balancing Mechanism for Improving DQDB Performance; Hyun, I.J. et al.; Conference Title: International Conference on Communications—ICC 91; Conference Location: Denver, CO; Jun. 23–26, 1991; Conference Sponsor: IEEE Communications Soc.; IEEE Denver Sect.; Abstract.

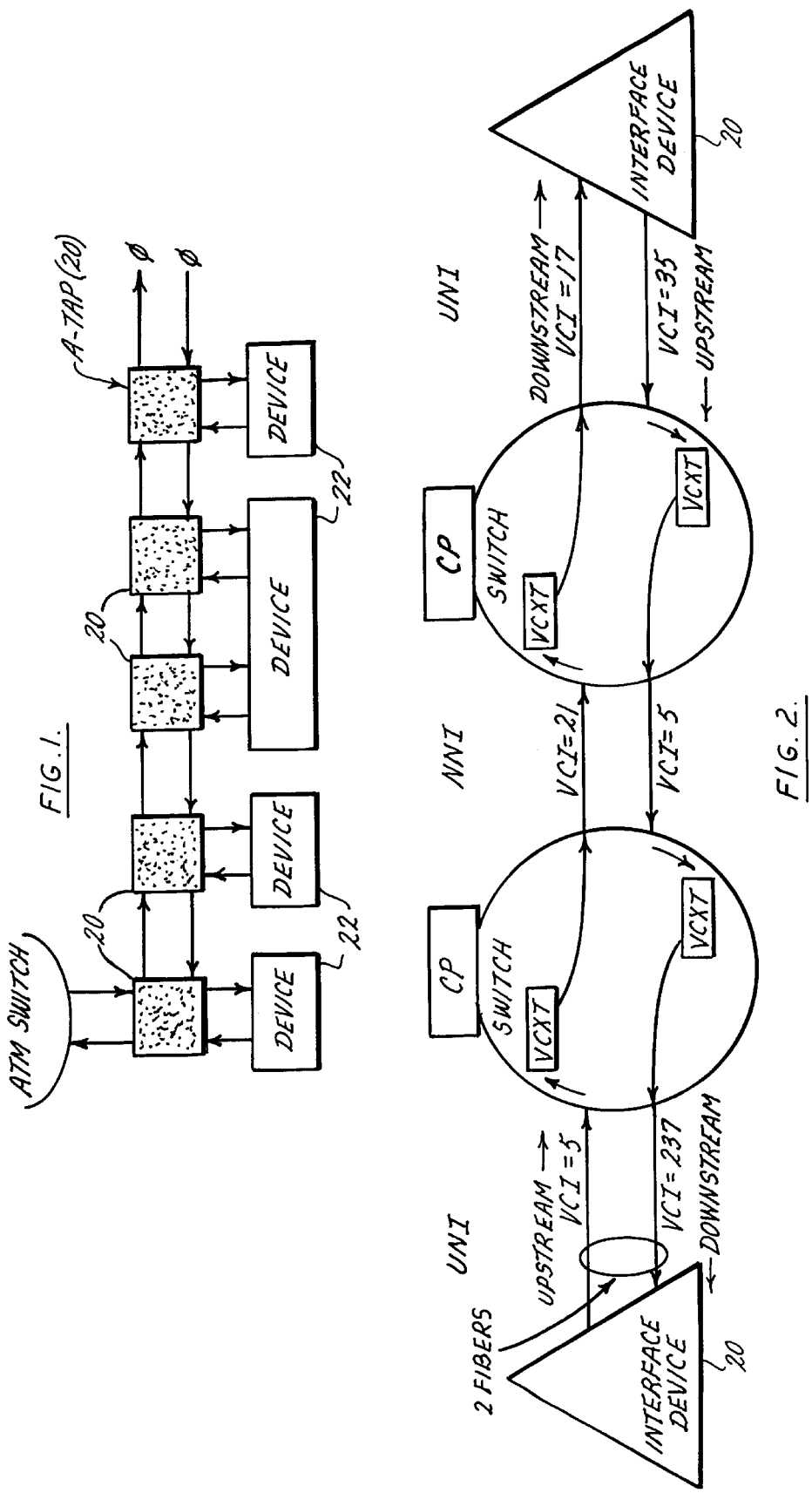

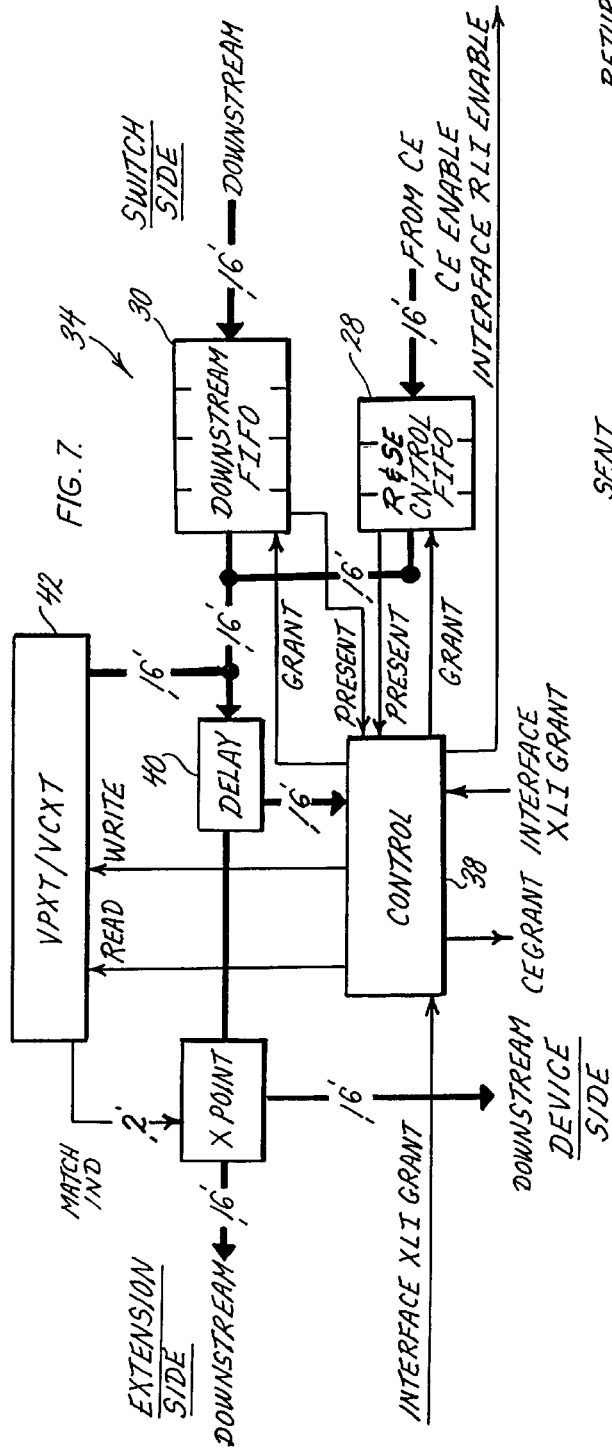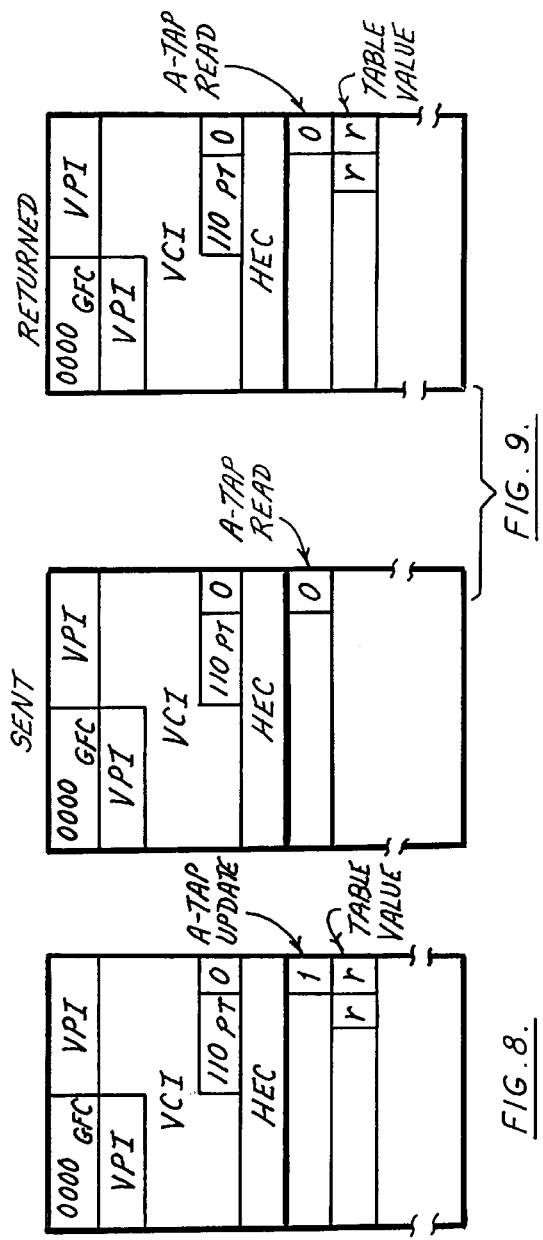
FIG. 7.
FIG. 8.
FIG. 9.

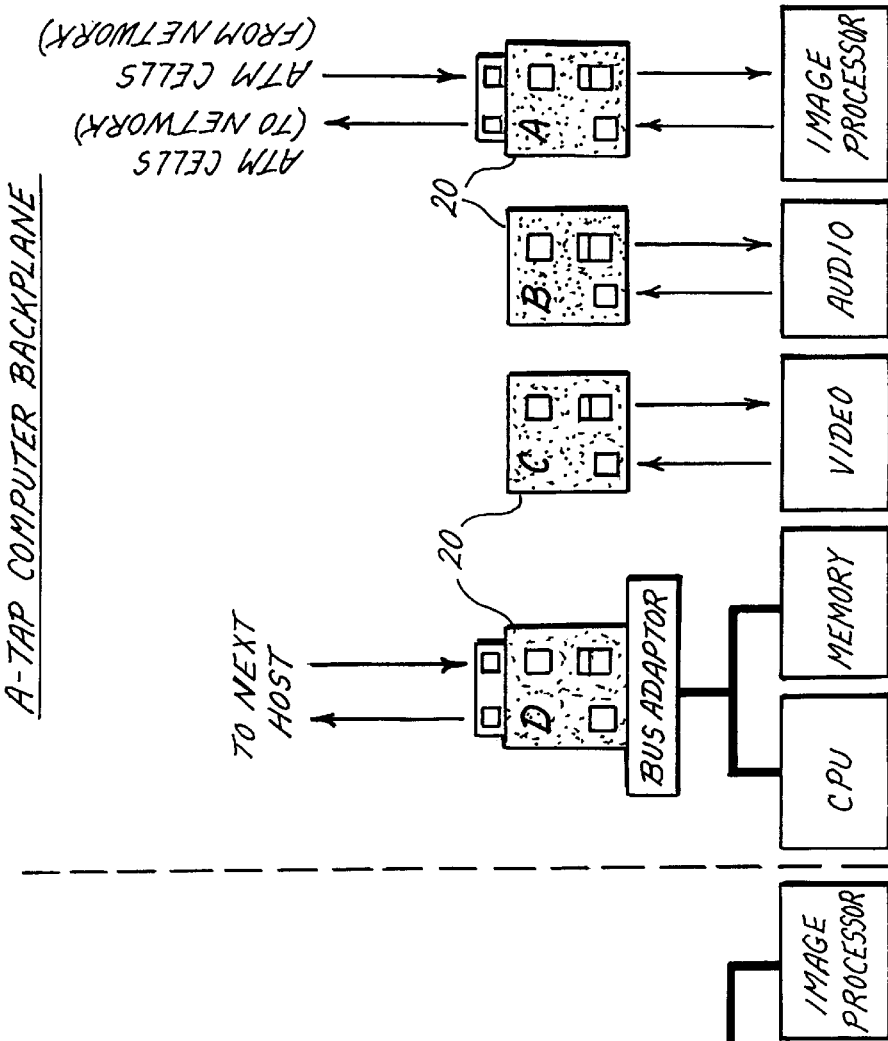
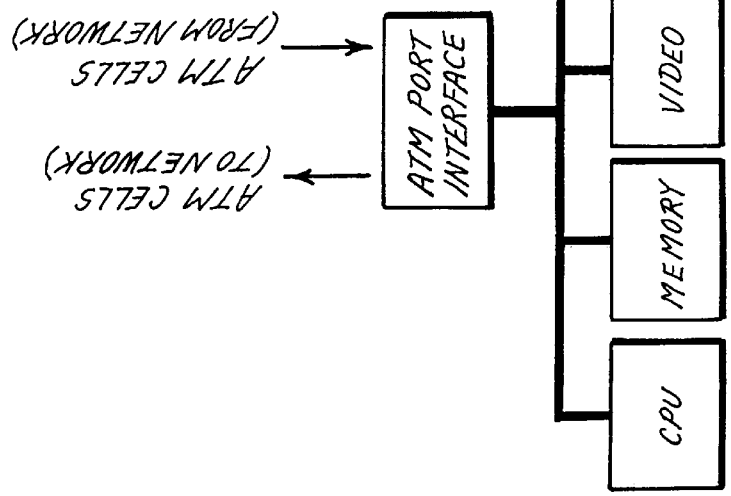
FIG. 17.

ATM SWITCH INTERFACE

This is a continuation of copending application(s) Ser. No. 08/113,854 filed Aug. 30,1993, now U.S. Pat. No. 5,524,113.

BACKGROUND AND SUMMARY OF THE INVENTION

A port on an ATM switch is a valuable resource. If a device is designed to interface directly with an ATM switch, but its functionality limits it to using only part of the bandwidth available from its access link, then utilization of this valuable resource can be uneconomical. Furthermore, providing multiple switch ports at some locations may not be convenient, even though more than one device needs access to the ATM network. In order to make more economical use of a port on an ATM switch, other devices in the prior art have been developed. For example, an ATM concentrator is available in the prior art which provides a plurality of ports all centrally located for accessing the ATM port. However, it offers a fixed number of additional ports at a single location so that a user who needs ports distributed throughout a building, for example, would not be able to make efficient use of a concentrator. Furthermore, the number of ports provided by a concentrator is fixed and is not readily modifiable. Another device available in the prior art is the proposed distributed queue, dual bus, for interfacing between an ATM port and a number of peripheral devices. However, this scheme requires modifications to the user interface hardware and an adaptation function. Furthermore, an access protocol overhead on the data transfer phase of a connection is required which reduces the data transfer capabilities.

In order to solve these and other problems in the prior art, the inventor herein has succeeded in designing and developing an ATM interface device which maintains the ATM interface standards and permits multiple devices to share a single ATM access port without interjecting an adaptation function or otherwise interfering with the direct transfer of ATM data between the port and the user's ATM device. With the inventor's interface device, port multiplexing is elegantly simple and preserves the essential operational behavior of the ATM network. It extends the ATM port to multiple interface devices efficiently and transparently and also preserves the functional behavior of ATM channel switching.

In essence, the interface device of the present invention may be readily implemented as a three plug card or board, each of the plugs being designated as either a switch side, device side, or extension side. Each of these "sides" designates the direction of connection for the interface device between the ATM network port and a user's device. As such, it is a building block type of device which permits a user to construct various configurations of sub-networks or busways through which the ATM cells are routed directly to and from connected ATM devices. Each ATM interface device includes a multiplexer to merge ATM data cells into a single upstream data stream and a routing and switching element which generally divides ATM data cell streams into different paths depending upon the configuration of the user constructed sub-networks or busways. A control element processes ATM data cells which are traveling upstream towards the network and either sends them on to the multiplexer or, if they are control cells, sends them to the routing and switching element in order that ATM data cells traveling downstream from the network are properly routed. Routing information for data cells which comprise a VPI/VCI table are stored in a VPXT/VCXT in communication with the routing and switching element. The VPXT/VCXT is updated with control cells received by the control element and transmitted through the routing and switching element.

The interface device of the present invention may be configured in several ways in order to provide different functionality. In the simplest configuration, the interface device may simply be cascaded in order to accommodate the connection of a plurality of ATM devices to a single switch port. In this first configuration, the ATM devices are connected with the switch side of the next succeeding interface being plugged into the extension side of the preceding interface such that they align in a single, unbranched, segment. In a variation of this single segment arrangement, branches may be made by plugging a switch side of an interface into a device side and then plugging additional interfaces using the switch side and extension side connectors as before. In this manner, branches may be made from a single "trunk" in various configurations in order to suit particular installations. This functionality of the interface device of the present invention provides tremendous flexibility to a network manager in building a network with multiple and branched segments. In still another variation, the interface device may be used to substitute for the back plane for a computer to provide direct interconnection between real time data intensive services such as video, audio, and image processing with an ATM network to thereby optimize their functionality. At the same time, a common bus may be utilized for interconnecting a CPU and memory as they are generally viewed as "tightly coupled" such that interconnection through an ATM network would be an inefficient substitute. However, such interconnection could be provided if useful. In still another variation, a ring network or work group of ATM devices may be interconnected using the interface device of the present invention in order to form a stand alone configuration. In this usage, one of the computers interconnected in the ring would need to provide the network control processor overhead, something which would be well known to one of ordinary skill in the art. Lastly, an internal host ATM ring could be formed which would provide an echo feature for viewing, for example, images prior to their being transmitted to the network. In this instance, an interface device would be interconnected between a user and the ATM network in reverse, with the device side being looped back to send the same data cells being transmitted back to the user. Such an interconnection would be desirable if, for example, a user wanted to verify an image or other data prior to its being broadcast over the ATM network.

As is apparent by the short description given in this summary, the inventor's device provides great functionality and is conducive to a number of variations which provide flexibility and features not heretofore known. The interface device itself, and its several different described uses, are more fully explained in the following detailed description of the preferred embodiment.

BRIEF DESCRIPTION OF THE DRAWINGS

FIG. 1 is a schematic view of the interface device of the present invention connected in a single segment;

FIG. 2 is a schematic diagram of an ATM network terminated by two switches and interface devices connected thereto;

FIG. 7 is a block diagram of the routing and switching element architecture of the interface device;

FIG. 8 illustrates the cell format illustrating one technique for updating VPXT/VCXT data;

FIG. 9 is an illustrative view of data cells transmitted to and from the interface device for updating VPXT/VCXT data;

FIG. 17 is a block diagram illustrating the use of the interface device to connect the various components of a computer terminal to provide a substitute computer back plane therefor;

DETAILED DESCRIPTION OF THE PREFERRED EMBODIMENT

Figure 3:
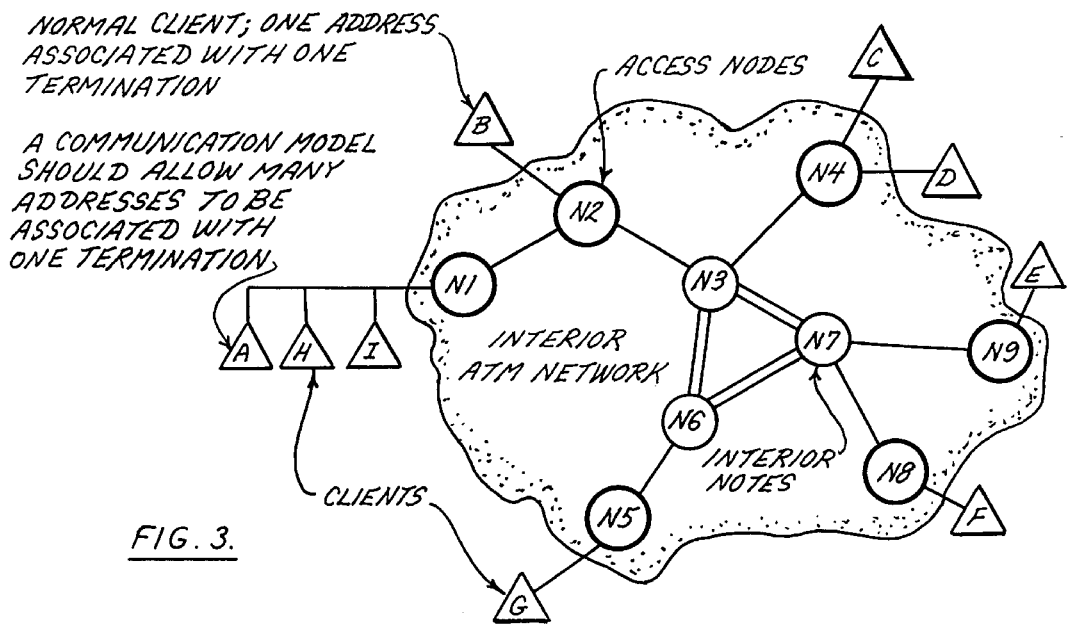
FIG. 3 is a schematic diagram further illustrating the interconnection of interface devices to an ATM network.

FIG. 1 describes the interface device or A-TAP 20 from a conceptual viewpoint. Each ATM device 22 in FIG. 1 might be spatially distributed—for instance, one A-TAP for two separate computers—or tightly coupled within a distributed computing machine (the third device from the left in FIG. 1). The A-TAP, therefore, has the potential to provide a ubiquitous multidrop interface for multiple computers or as a distributed A-TAP computer backplane. The essential method of "tapping" the ATM stream is the same. ATM Networks The ATM protocol has been defined by CCITT for communicating over Broadband Integrated Services Digital Networks (BISDNs). It has also emerged as the primary candidate for next generation Local Area Networks (LANs). Clients of an ATM network communicate by first creating a virtual channel connection between themselves, then transmitting data on this connection. The connections can be either point-to-point (involving two clients) or multipoint (involving three or more clients). Multipoint connections allow multicast communication, where all data sent by one client is received by all other clients participating in the call that have chosen to receive on that connection.

Virtual channel connections are identified in the ATM standard by assignment of Virtual Channel Identifiers (VCIs). At the User-Network Interface (UNI) they are assigned via negotiation between an ATM switching system (controlled by the system's Control Processor (CP)) and the requesting network access device. After the connection is established, data flows between the ATM network and the interface device with each cell marked with the assigned VCI number. The VCI number need not be the same for the upstream and downstream side of the bi-directional ATM interface (this is referred to as uni-directional channel assignment). Most ATM designs (switches and some interface devices) utilize some form of a VPI/VCI Translation Table (VPXT/VCXT) to manage the VCI translation at each interface. This is needed to accommodate the high. speeds of ATM data transfer and allows different VCIs to be mapped at each node. FIG. 2 describes a connection between two network subscribers at the UNI and the Network-Network Interface (NNI) in a simple ATM network.

The connection is set up between two clients by use of a connection management access protocol (Q.93B or CMAP). This protocol allows an interface to signal the control processor that it wants to establish a connection with another device. The CP sets up the connection and signals the clients when that task has completed. Thereafter, data is sent between clients as shown in FIG. 2 without processing by the CP. This is referred to as the connection setup or call setup phase of client to client communication.

It is through a suite of connection management protocols that a set of switches and their connected client equipment are turned into a network. These protocols define a communication model that describes how clients of the network may interact with one another. An important aspect of such a model is the definition of the network boundary that determines where equipment is considered either client or network. Network equipment will normally have privileged access to internal protocols and other network equipment that may be hidden from view of network clients. The client is constrained to interact with the network through the access protocols. In the simplest case, a fiber optic link (FOL) connected to an interface node (ATM switch or equivalent) defines the network interface that delineates this client/network boundary. A simple communication model would associate a single network address with one network termination. The A-TAP extends this model with minimum overhead so that the client/network interface can have multiple addresses (and multiple devices) associated with one network termination.

To understand the utility of the A-TAP, it is useful to understand how multiple clients—with distinct network addresses—at a single termination will interact with network access protocols. FIG. 3 describes how a control processor (CP)—that houses the network side of the connection management access protocols—views a multiple address termination point. The CP need not understand how the access link interface devices (A-TAPs or equivalent) allow multiple devices to interface to a single network port. It views each address as being a separate entity that has separate connection management controllers (the client side of the access protocols). Client connection management controllers need not cooperate, interact or even be aware of the presence of others (although they are not prevented from such interaction if this is desirable). The clients may access the CP asynchronously and compete with one another for the resources available on the shared access link. Negotiation of virtual channel identifiers can be explicit—between clients prior to a request to the CP—or by CP arbitration. The CP is the central arbitration point and will not allow two clients to have the same VCI or to exceed the bandwidth requirements of the shared interface. The CP serializes all requests and determines VCI/bandwidth arbitration on a first come, first serve, basis (though more complicated schemes may be used). After the client has been granted his request for VCI/bandwidth the call/connection associated with the request is established in the network. The client equipment then sends an A-TAP control message and the A-TAP functionality assures that all ATM cells from the client's call/connection are routed to the client's destination. No additional signaling or link-level transport (beyond the generic ATM level protocol) is required.

It is also possible to use multiple A-TAPs within a single client—as a multi-ported host interface. In this way, the A-TAP can be used by a client device to segregate ATM traffic into separate cell streams. In this case, it is possible that the client only has one network address—and by inference, one client connection manager. When used in this fashion, the A-TAP is used only as a local access control mechanism transparently from the network or other client devices. FIG. 1 describes the mixture of these types of client devices. Hardward Architecture Overview The ATM-TAP, or A-TAP 20, is designed to extend the UNI ATM interface from one device (FIG. 2) to many devices while maintaining the UNI functionality for each device. There are two main functions required of the A-TAP to achieve this functionality. First, cells arriving from the network have to be routed to the attached A-TAP devices or to other A-TAP devices downstream from the current A-TAP. This amounts to a simple routing and switching function based on ATM channel identification (VPIs and VCIs) for the downstream flow of cells from the switch. The second requirement is to interleave cells sent from each A-TAP device to the network onto a single upstream flow of cells. The interleaving of cells is a straightforward task that requires no control overhead from the attached A-TAP device. The routing function, however, does require control input from the A-TAP device to indicate which ATM channels it is interested in receiving cells from and which should be passed to downstream neighbors.

Figure 4:
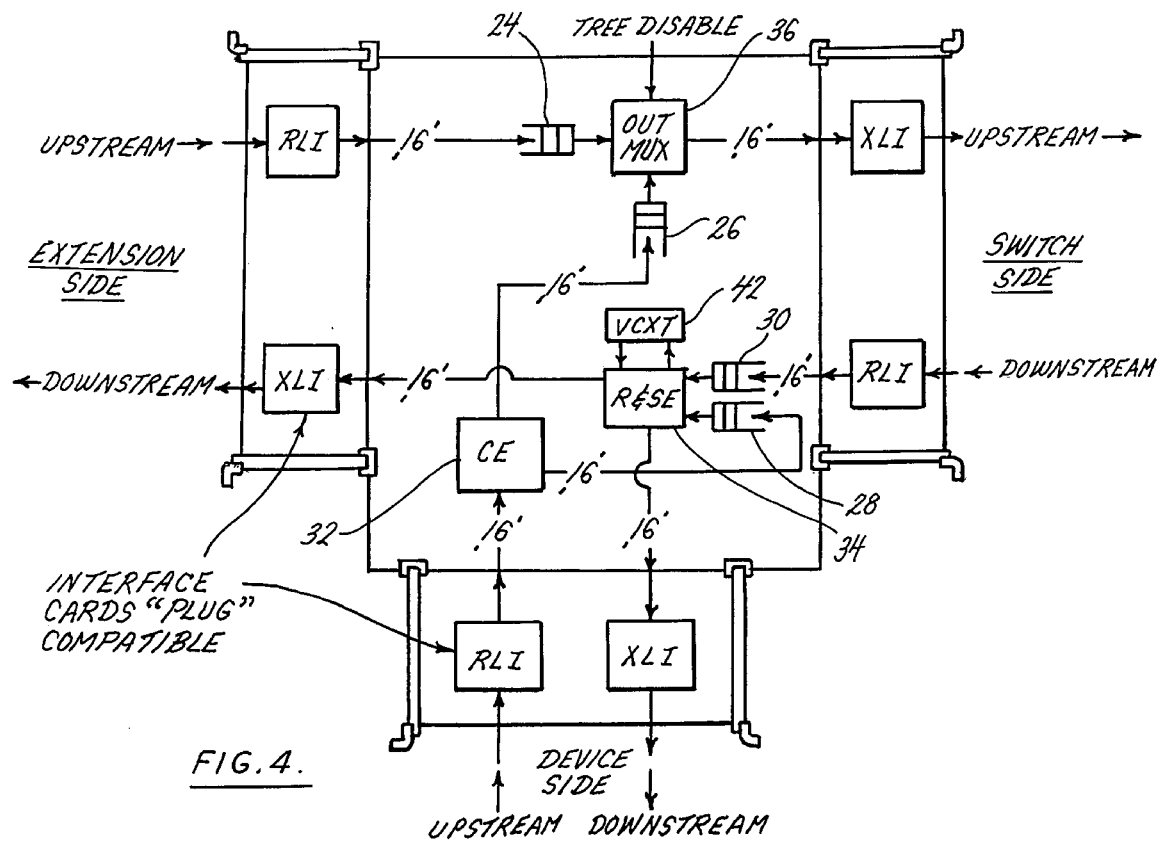
FIG. 4 is a block diagram of the interface device of the present invention detailing the hardware elements.

FIG. 4 describes the A-TAP hardware architecture that accomplishes these functions. The output Multiplexer (OUT MUX) buffers 24, 26 are required to interleave the two upstream cell streams (cells destined for transfer to the network and which may not, over time, exceed the capacity of the link). The Routing and Switching Element (R&SE) buffers 28, 30 exist to provide the R&SE the ability to accept control messages while simultaneously accepting cells from the network (one or two cell registers may be sufficient if the R&SE can operate at link speeds). The control functionality of the Control Element (CE) 32, R&SE 34 and OUT MUX 36 are very simple. Therefore, it is reasonable to expect that the A-TAP core can be implemented within a single VLSI chip (thus reducing cost). The interface cards are designed to allow multiple interfaces to be developed, fiber, coaxial, twisted pair, bus etc., thus improving flexibility.

The Control Element (CE) 32 processes upstream cells generated by devices directly connected to its Device Side port or from other A-TAPs that are connected to the Device Side from their Switch Side.

It is illegal to connect the Device Side of an A-TAP to the Extension Side of another A-TAP. To do so would "reverse the flow" of upstream and downstream data relative to the ATM network access port, resulting in chaos.

Figure 5:
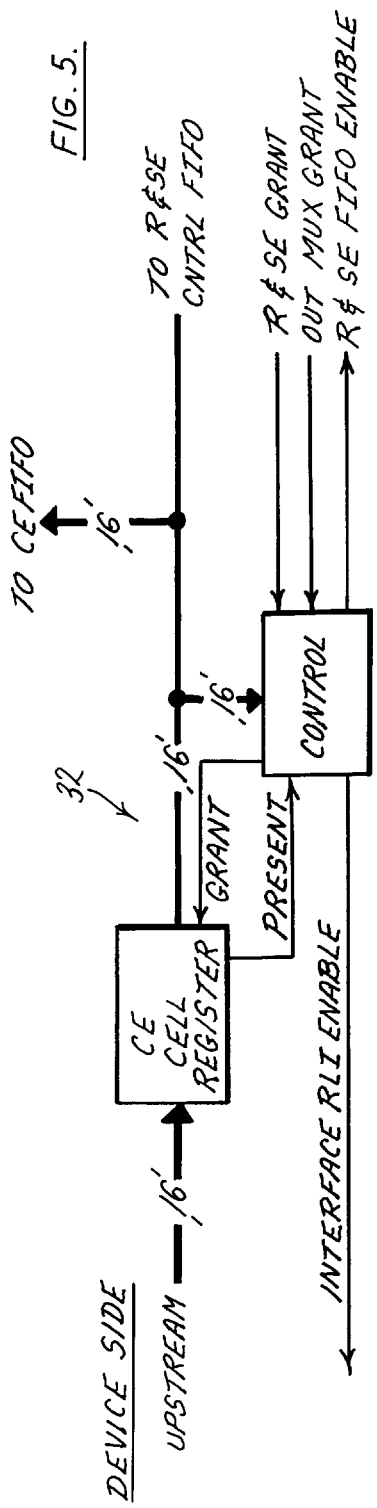
FIG. 5 is a block diagram of the control element architecture of the interface device.

The CE 32 accepts all ATM data cells and sends them to the CE FIFO 26 of the OUT MUX 36. If the CE 32 detects an A-TAP control cell it sends the cell to the Routing and Switching Element (R&SE) control FIFO 28 and the CE FIFO 26 of the OUT MUX 36. No direct manipulation of cell contents is required in either case. FIG. 5 describes the CE 32 in more detail.

The OUT MUX 36 multiplexes the upstream cells from the CE 32 and the upstream port of the Extension Side onto the upstream port of the Switch Side of the A-TAP. All cells are transferred unmodified by the OUT MUX 36 except A-TAP control messages whenever the Tree Disable configuration pin is set. The Tree Disable switch is set for the A-TAP that is directly connected to the ATM switch to tell the OUT MUX 36 to not forward the A-TAP control cells to the ATM network. All other A-TAPs should have this switch unset when configured in a tree. All A-TAP control cells are, therefore, sent upstream to all A-TAPs when this pin is not set.

The optional configuration pin (Tree Disable) may also be used to disable the feature on the entire A-TAP segment (not just the last upstream A-TAP device). A-TAP segments which are not supporting ATM "trees" may configure the OUT MUX to not forward A-TAP control cells to the upstream Switch Side XLI. When the A-TAP is not branched into tree segments then it is unnecessary to propagate the control cells down to the last A-TAP (as described below. An example where this might be useful is the preferred embodiment for this invention of the multiple A-TAP host interface.

Figure 6:
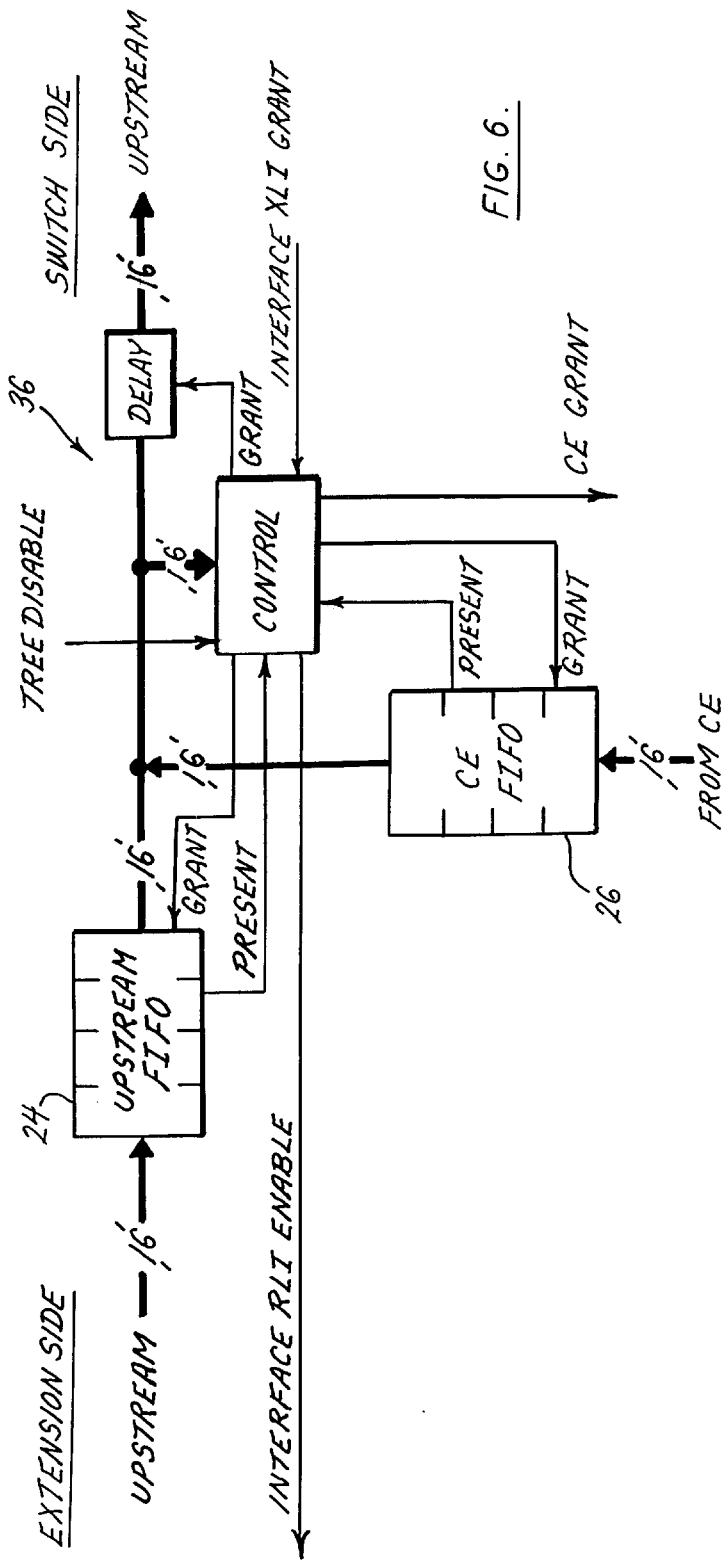
FIG. 6 is a block diagram of the output multiplier architecture of the interface device.

The CE FIFO 26 and the Upstream FIFO 24 have to be dimensioned to provide proper interleaving of data between downstream and device side neighbors. In general, this may be demanding because the different sources are not synchronized, nor can it be necessarily expected for them to be cooperating. However, it can be expected that the network signaling software will constrain the overall traffic flow to be consistent with the bandwidth capabilities of the access link for extended periods of time. Nonetheless, given the speeds with which the ATM networks may transfer cells—approximately 350,000 per second at 155 Mbps—it is prudent to dimension these FIFO 24, 26 relatively large to avoid cell loss. FIFOs of the size of 128 to 256 are not unreasonable if the A-TAP core can accommodate this requirement. It should be noted that extra FIFO space can cause additional delay under congestion, and in so doing, cause additional network "jitter". This might make a shared memory configuration a reasonable thing to do at the OUT MUX module. FIG. 6 depicts the out MUX 36 in greater detail.

The R&SE 34 provides the basic routing required of the A-TAP by checking the VPI/VCI of an ATM data cell received from the downstream port of the Switch Side against a VPXT/VCXT table to determine if the cell should be routed to the downstream port of the Device Side and/or the downstream port of the Extension Side. The cell itself requires no modification because the VPIs or VCIs are not translated. FIG. 7 depicts the R&SE 34 in more detail.

The R&SE 34 accepts one cell each cell time from the Downstream FIFO 30 (unless a control cell is present in the R&SE CNTRL FIFO 28). The R&SE Control module 38 detects that a cell is present in the Downstream FIFO 30 and causes the Downstream FIFO 30 to put the cell into the Delay buffer 40. THE VPXT/VCXT subsystem 42 will be directed to read the VPI/VCI pair from the cell when the Control module 38 asserts the read pin. The VPXT/VCXT 42 will respond with a match indicator ($00_2$ means no match and send to downstream port of the Extension Side, $01_2$ means match and send to the downstream port of the Device Side only and $11_2$ means matched and send to the downstream port of the Extension Side and the Device Side—the Xpoint may be directed to send to both outputs). Based on this information the Control module 38 will assert the port signal to the Xpoint module (again $00_2$, $01_2$, $11_2$) which will gate the cell to the appropriate port or ports.

Generally speaking, the Downstream FIFO 30 should be empty—the R&SE element 34 can process cells as fast as the Switch-Side RLI can send them. Control cells (from the R&SE,CNTRL FIFO 28), however, can interrupt the flow between the Switch-Side RLI and the R&SE element 34 because control cells have precedence over data cells in the Downstream FIFO 30. A data cell delayed for this purpose will be held in the FIFO 30 until such time that (1) the CNTRL FIFO 28 is empty and (2) an empty cell arrives from the Receiver Link Interface of the Switch Side Interface. If the Downstream FIFO 30 were to become full, then the grant would not be asserted to the Receiver Link Interface (RLI) and a cell is discarded in the RLI. Since the downstream flow of cells from the network to all A-TAPs must contend only with A-TAP control cells, and since A-TAP control cells are infrequent, the probability of dropping cells due to contention should be very small. The Downstream FIFO 30, therefore, may be minimally dimensioned (8–32 cells).

The VPI/VCI table, must only retain data that indicates whether a cell (VCI) should be sent to the Extension Side, Device Side or Both Sides. This requires only two bits of information per VPI/VCI pair. To support all $2^8 * 2^{16}$ VPI/VCI pairs would require 33,554,432 bits or approximately 4.2 MegaBytes of storage. Most host interfaces and ATM switch interfaces do not support the full range of VPIs/VCIs available with the ATM standard. The A-TAP, therefore, may be engineered to support a lesser VPI/VCI range (for instance, $2^8$ VPIs and $2^{10}$ VCIs which would require 65,536 KiloBytes (65 KB) of storage).

An alternative method of storing the required routing information would be through a Content Addressable Memory (CAM). The VPXT/VCXT would only have to store those VCIs which are "active" for a device side (i.e. where a device side host has determined-that it wants access to a particular ATM channel). The VPXT/VCXT, therefore, need store only those VPIs/VCIs that are assigned to the Device Side, if the VPI/VCI pair is not found then the default is to send it to the Extension Side. This method is the preferred embodiment of the A-TAP VPXT/VCXT table.

The R&SE 34 accepts A-TAP control cells from the CE 32 by way of the R&SE CNTRL FIFO 28 to manage the VPXT/VCXT 42. The R&SE Control module 38 gives precedence to control cells from the device side (these cells should generally be infrequent) to insure that control/update information is not lost. Given this precedence the CNTRL FIFO 28 may be minimally dimensioned (2–3 cells).

When a control cell arrives from the CE module 32 it is put into the R&SE CNTRL FIFO 28 and the present pin is raised to the R&SE Control module 38 to indicate that a cell is present in the FIFO 28. On the next cell processing cycle the R&SE Control module 38 will withhold grants to the Downstream FIFO 30 and assert a grant to the CNTRL FIFO 28 instead. The CNTRL FIFO 28 will send the cell to the VPXT/VCXT 42 which will process the cell and update its table when the R&SE Control module 38 asserts the write to the VPXT/VCXT 42.

FIG. 8 shows the format of the A-TAP control message for updating a VPXT/VCXT table entry. The OA&M cell type from the ATM standard is used. A two-bit field is embedded in the payload to describe whether the VPXT/VCXT should send cells arriving on the indicated VPI/VCI to (1) $00_2$— Extension Side, (2) $01_2$—Device Side, or (3) $11_2$—both sides. As standards emerge for various OA&M cell formats, the intent is to conform to those standards as appropriate. The cell format depicted in FIG. 8 is the preferred embodiment given the current state of the standards concerning this type of UNI control. It is important to note that A-TAP control cells are not meant to be sent to the network—one of the purposes of the Tree Disable configuration pin is to prevent that from occurring—so this mechanism may be applied outside of standard interfacing requirements from CCITT, the ATM Forum or ISO.

FIG. 9 shows the format of a table read operation. The cell on the right is what the device side client sends to the A-TAP and on the left is the cell returned to the device side client after the entry has been read.

The Plug Compatible Interface Cards (PCIC) are designed to have a generic interface with the A-TAP "core". The interface receives power, clock and grant signals from the core and transfers data on the two uni-directional 16 bit bus interfaces. Any transmission media may be used as long as it can keep up with the link speed. A common interface for Switch and Extension Side interfaces would be fiber. The Extension and Switch Sides are not required to have fiber, they too, may have alternate interface transmission media. The Device Side interface can utilize a more economic interface, twisted pair, coaxial, bus etc. This is application dependent and configurable by a network manager based on usage and economies of scale.

There are two types of cells that the A-TAP recognizes: ATM data and A-TAP control. The data flow properties of both types of data from all switch inputs will be described.

Figure 10:
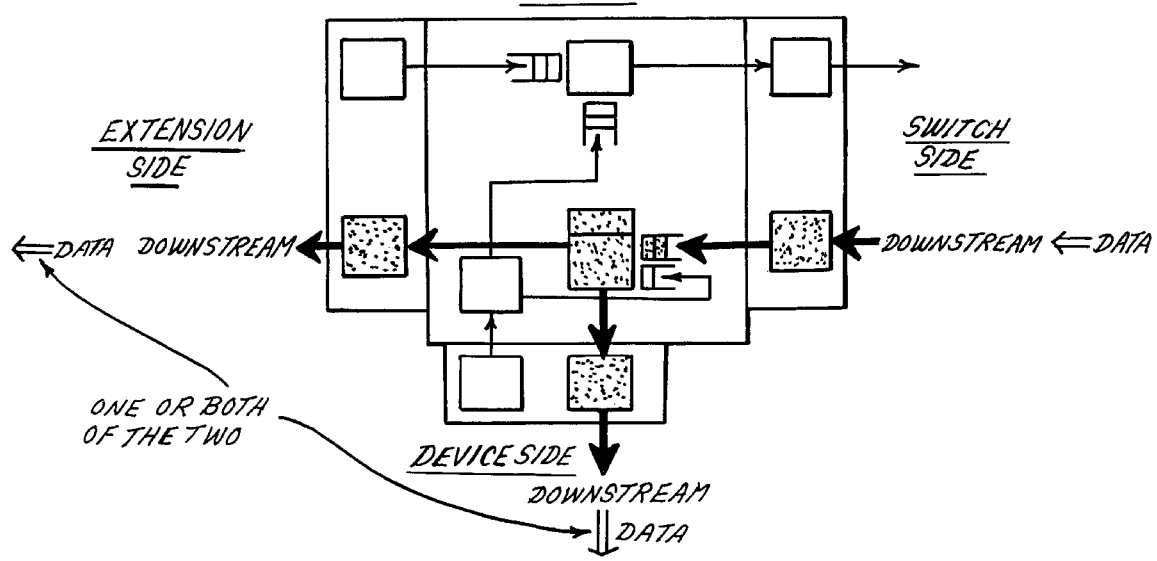
FIG. 10 is a schematic view of the interface device illustrating downstream data flow through the switch side.

When ATM data arrives at the A-TAP on the downstream port of the Switch Side it will be sent to one or both of two output ports depending on the data stored in the A-TAP VPXT/VCXT. If the VCI stored in the cell has a match in the VPXT/VCXT it may be sent to the Device Side only or the Device Side and Extension Side. If there is no match then it may be sent to the Extension Side only. Data arriving on this port originated from the switch as shown in FIG. 10.

Figure 11:
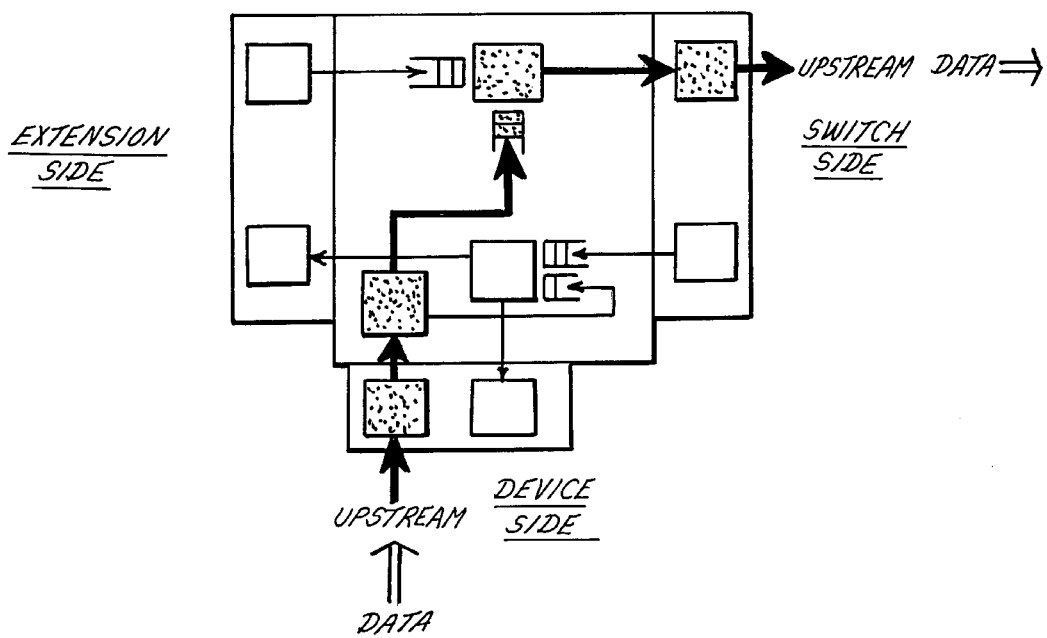
FIG. 11 is a schematic view of the interface device illustrating upstream data flow through the device side.

As shown in FIG. 11, when ATM data arrives from the upstream port of the Device Side (originated from a device) it is always sent to the upstream port of the Switch Side (it is always destined for the network switch).

Figure 12:
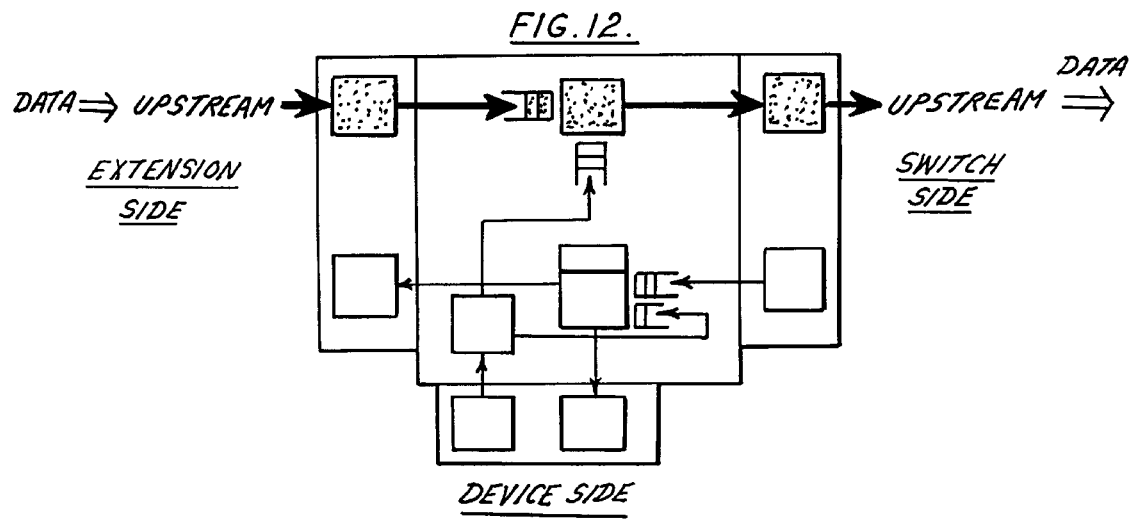
FIG. 12 is a schematic view of the interface device illustrating upstream data flow through the extension side.

As shown in FIG. 12, when ATM data arrives on the upstream port of the Extension Side it is always sent to the upstream port on the Switch Side. This data originated from a device connected to an ATM-TAP that is located downstream from this tap. The data is intended to be sent to the ATM Switch.

Figure 13:
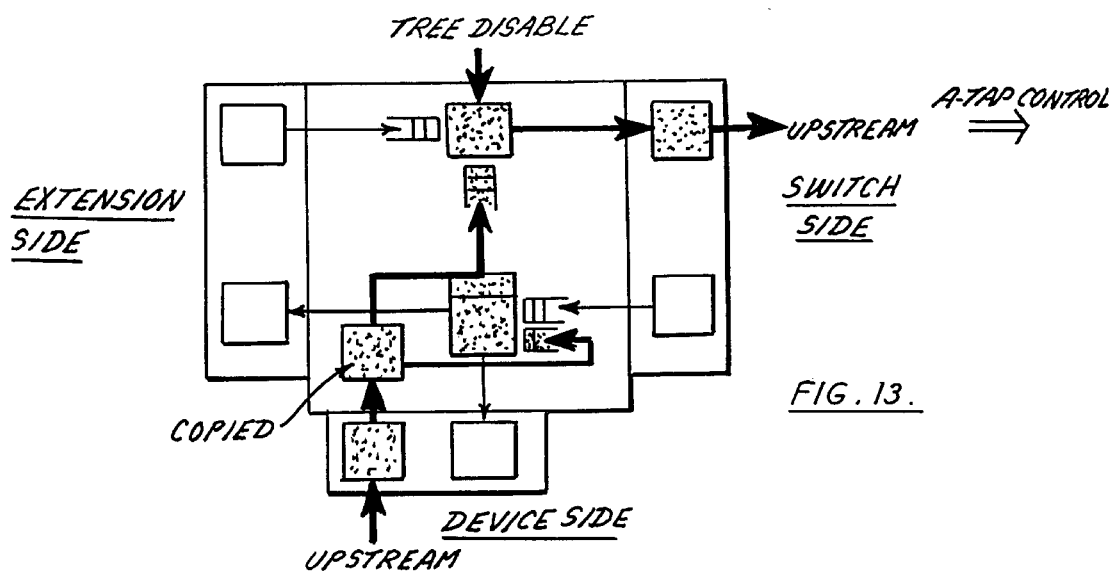
FIG. 13 is a schematic view of the interface device illustrating the upstream flow of a control cell through the device side.

A-TAP control cells are used by a device to set up all A-TAPs in an A-TAP segment to route data for the designated VCI to the device. An A-TAP control cell arriving on the upstream port of the Device Side of an A-TAP is replicated by the CE and sent to the control port of the R&SE and the data port of the MUX (unless the Tree Disable pin is set, which disables the forwarding of the A-TAP control cell to upstream neighbors). The R&SE will process the A-TAP control cell and update the VPXT/VCXT for the designated VPI/VCI. The MUX will send the A-TAP control cell to the upstream port of the Switch Side for output to the next A-TAP (see FIG. 13). If the Tree Disable input is high then the cell is consumed by the MUX and is not sent out to the Switch Side.

A-TAP control cells that arrive on the upstream port of the Extension Side are not used to update the VPXT/VCXT. As shown in FIG. 12, they are sent to the upstream port of the Switch Side for output to the next A-TAP. Again, if the Tree Disable input is high then the cell is consumed by the MUX and is not sent out to the Switch Side.

Throughput

Given that all internal buses are 16 bits wide, an A-TAP clock cycle of 40 MHz would provide throughput on the order of 640 Mbps. This would be sufficient to support proposed SONET rates of 155–620 Mbps. Clocking the A-TAP at 75 MHz would provide throughput on the order of 1.2 Gbps.

A-TAP Usage

An A-TAP may be utilized in any one of the following configurations to interconnect widely dispersed ATM devices.

Figure 14:
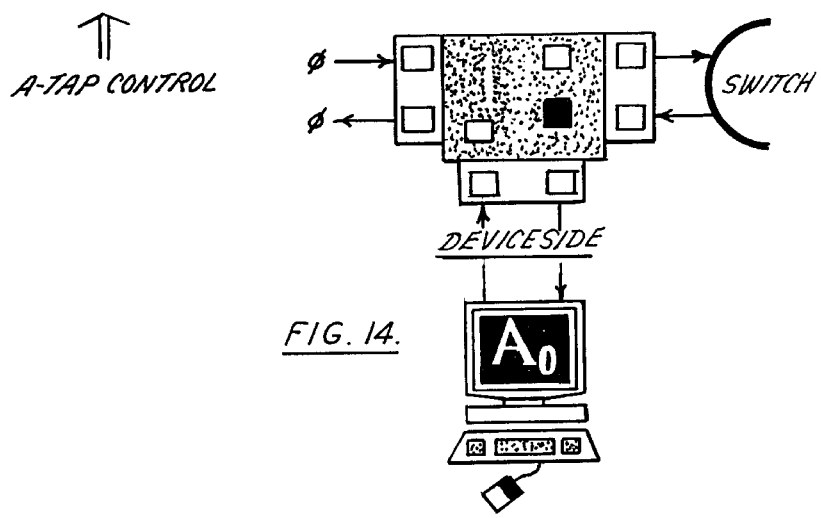
FIG. 14 is a schematic view illustrating connection of a single interface device between a user and an ATM switch.

As shown in FIG. 14, the first device is connected to the Device Side of the singular A-TAP segment. The Tree Disable switch is set. A-TAP control cells sent from device $A_o$ will update the VPXT/VCXT of A-TAP 1 because they are received on the Device Side of the A-TAP and will then be consumed because the Tree Disable pin is set.

Figure 15:
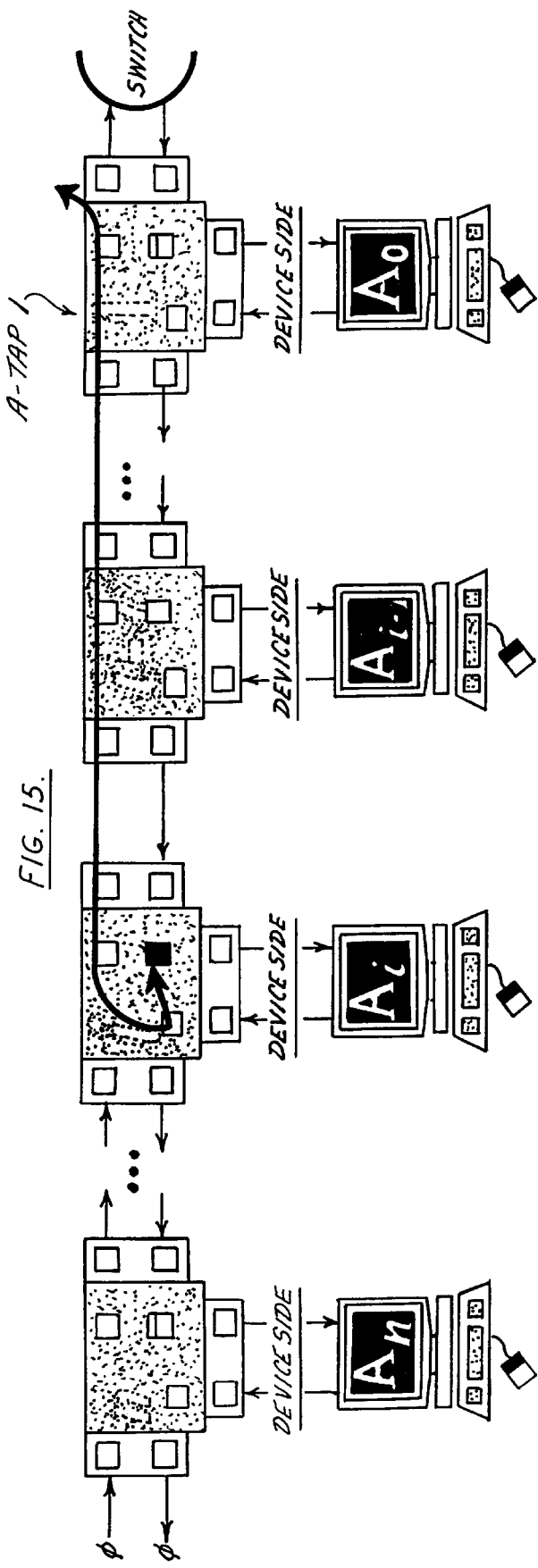
FIG. 15 illustrates the interconnections between a number of interface devices to construct a single segment.

Multiple devices may be connected by connecting a new A-TAP to the free Extension Side and connecting the devices to the Device Side of the A-TAPS. When Device A sends an A-TAP control cell its A-TAP's VPXT/VCXT will be updated and no others. The cell will flow toward the SWITCH and be consumed by the last (first) A-TAP (A-TAP 1 as marked in FIG. 15).

Figure 16:
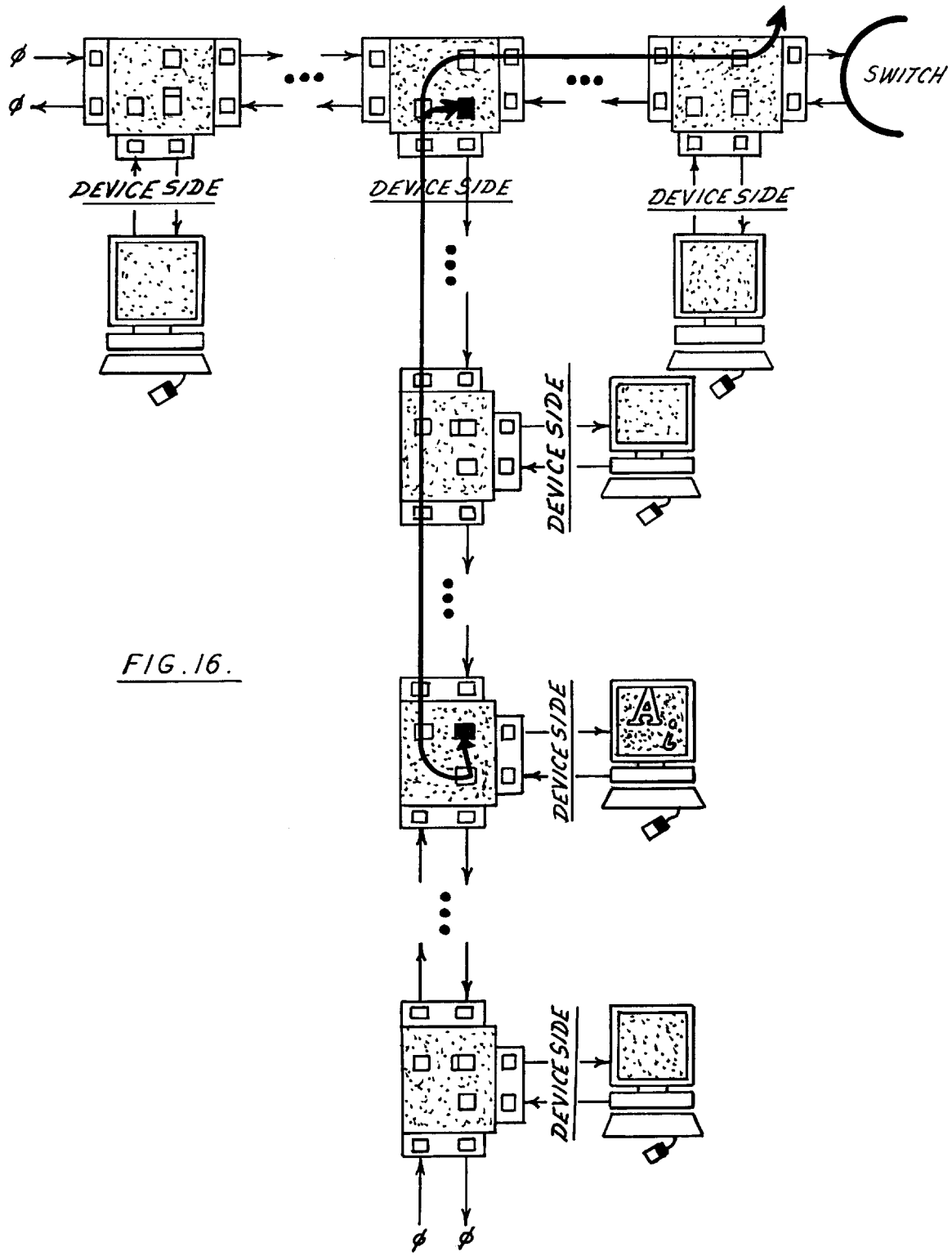
FIG. 16 illustrates the interconnection of a plurality of interface devices to illustrate a branched segment.

A-TAP segments may be connected in a tree fashion by connecting an A-TAP Switch Side to a Device Side. This provides flexibility to the network manager in building A-TAP segments. Each leg of the tree is called an A-TAP segment and the A-TAP that connects the two segments is called a joining A-TAP. The ATM Control algorithm guarantees that all devices in the downstream path will have the VPXT/VCXT updated to insure that data is switched in the correct direction. FIG. 16 describes the control update of a connecting A-TAP and a joining A-TAP.

A-TAP Host Backplane Interface

The generality of the A-TAP for interconnecting distributed computers in a single multidrop segment or a tree of multidrop segments is a useful and desirable feature. Providing this rich interconnection mechanism while faithfully preserving the ATM functional and operational interface is equally important. The most useful application of the A-TAP, however, may be in its use as a distributed host interface—essentially using the A-TAP chips tightly coupled in a computer backplane to replace the host backplane bus.

FIG. 17 shows a simple comparison of the two approaches. The typical computer backplane for ATM networks implements the ATM interface as "yet another network device". The ATM interface must adapt a very high speed (relative to the bus interface) asynchronous communication network (ATM) with a (typically) synchronous contention bus of fixed bandwidth. Most computer backplane buses operate as a shared resource with contention overhead. Furthermore, many busses only allow one master (typically the CPU) and this makes it doubly difficult for the ATM interface device to get "bandwidth on demand" from the backplane bus subsystem. The shared bus fixed bandwidth problem is compounded by the emergence of real-time data intensive services such as video, audio and image processing. The A-TAP solves these problems by allowing each of the computer subsystems to "bleed" off cell streams from the ATM network through a dedicated A-TAP interface. The computer backplane becomes "native ATM"—making the ATM cell the ubiquitous information "quantum". Since most of these devices require that their information be decomposed into ATM cell streams anyway, this type of "cell based" bus interfacing makes good sense. The effective bandwidth of the ATM bus interface may be easily "subdivided" by adding additional A-TAPs as new devices are added. Additionally, each A-TAP may operate up to full link speed, thus providing the host with true "bandwidth on demand", adaptable to the asynchronous nature of the devices that it interfaces to.

Using the A-TAP as a tightly coupled host interface requires no modification to the essential A-TAP core design. Each device that interfaces with the A-TAP merely acts as a Receiver Link Interface (RLI) or a Transmitter Link Interface (XLI) as appropriate. Flow control is provided by the RLI/XLI grants between the A-TAP core and host's devices that connect to it. Instead of FOLs connecting the devices, point-to-point unidirectional interconnect is used. The host might want to utilize the Tree Disable pin configuration. It also may decide to terminate the cell stream at the end of the A-TAP segment (A-TAP D in FIG. 17) to avoid the cost of extending the segment to another host. Alternatively, the host might provide a "multiple computer interconnect"—perhaps with an inexpensive twisted pair interface—so that downstream host interfacing can be easily done. (Similar to how Macintosh® computers come equipped with "ready-to-go" Appletalk® interfaces.)

Figure 18:
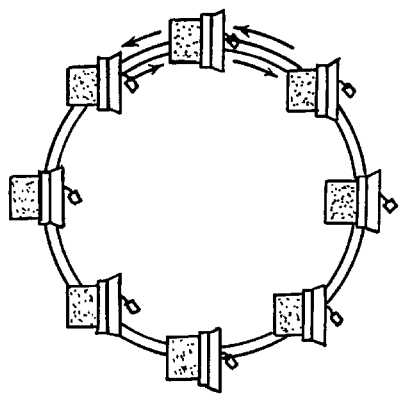
FIG. 18 illustrates the use of the interface device to construct an ATM ring network.

It is also possible to build a simple "workgroup" ATM network out of A-TAP equipped computers, as shown in FIG. 18. By connecting the computers in a ring, the computers can communicate with each other without the need of an ATM network. (One of the computers will need to act as a network signaling agent (i.e. functioning as the Network Control Processor (CP)) if true transparency is required.) This stand-alone configuration is essentially a "free" artifact of the A-TAP design. No extra hardware is required to support this configuration.

Using the A-TAP as a computer backplane does have one drawback. For devices that communicate primarily in a bi-directional manner—the CPU and memory for instance—it would be inconvenient to have to send cells to the network to have them sent back to a neighbor device connected to an adjoining A-TAP. For this reason, it is expected that the computer bus will not be replaced by the A-TAP, merely enhanced. Some devices will use an internal bus and others will use A-TAPs. Current trends in computer design reflect this separation of functionality. In many of today's computers an internal bus connects tightly coupled components, like the CPU and Memory, and a backplane bus connects peripheral devices, like network interfaces and disk controllers. It is the backplane bus that is envisioned as being replaced with an A-TAP segment. The complete demise of the computer bus is not envisioned but rather a reduced role as an internal interconnection mechanism where it makes sense, and ATM connecting everything else. The devices that interface directly to ATM using the A-TAP, therefore, will typically be peripheral devices like video, audio, image serving, image processing etc. This hybrid configuration was shown in FIG. 17. These types of devices are typically communicating with similar devices through the ATM network. For instance, the video server device might send a video source to a remote network client and that remote client might be sending a video source to a video receiver device connected to another A-TAP on the user local backplane—establishing a bi-directional video communication link.

Nonetheless, it may still be desirable under certain circumstances for a host's peripheral devices to send cells to one another. For example, in the case of the video server and receiver, the user might want to see what image is being presented to the network by "echoing" it back for viewing. This can be accomplished by the computer via the network by setting up a connection from itself, to itself. The cells from the server would be sent upstream to the network and the network would redirect them downstream to the receiver. The video receiver device would update its A-TAP to direct the downstream cells to be sent to it.

Figure 19:
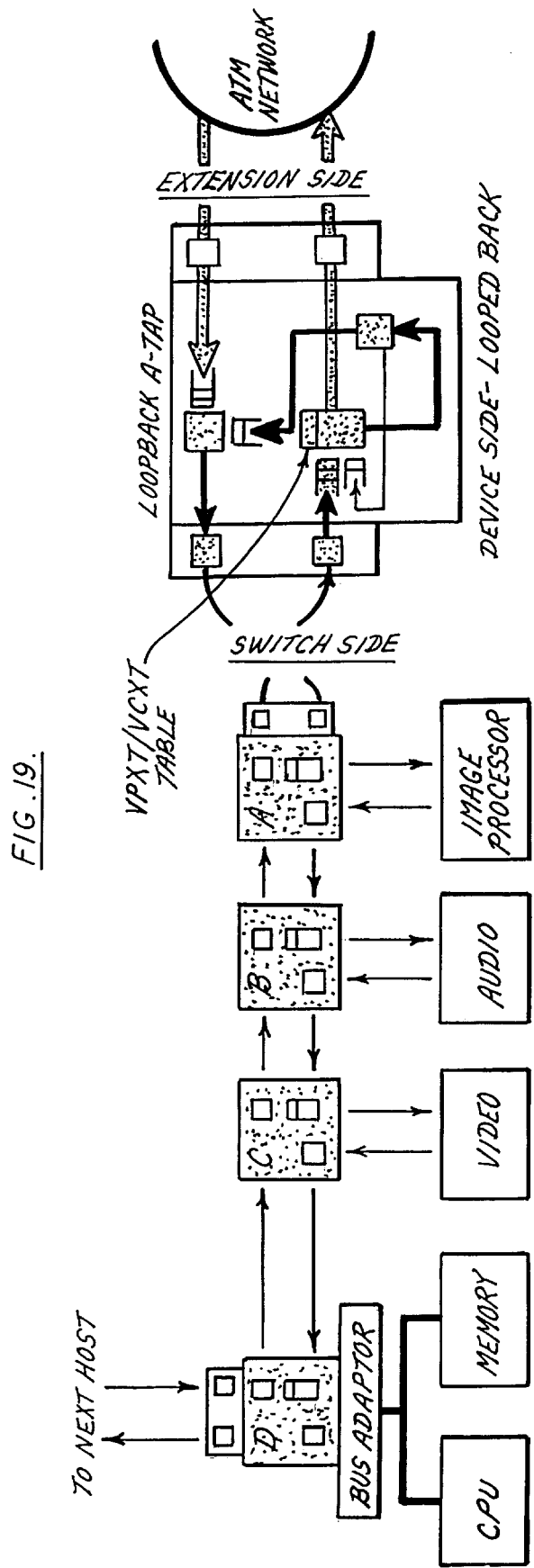
FIG. 19 illustrates the use of an interface device for providing an echo back or loop back feature.

An alternative method for setting up these "echoed" connections is described below. This feature is called an Internal Host ATM ring. To implement this feature, an additional A-TAP core chip is used that is "rotated" in such a way that the switch side interface of the rotated A-TAP faces the switch side interface of the A-TAP segment that connects the host devices. FIG. 19 describes this use of the A-TAP. Note that the device side interface is "looped back", this allows cells to be "echoed" back to the downstream side prior to the network. In order to selectively perform this service, the ability for any device to send A-TAP control cells to the loopback A-TAP must be supported. In this way, a receiving device may send an A-TAP control message to set its interface A-TAP VPXT/VCXT table to route the downstream connection to it and the transmitting device may send a message to the loopback A-TAP to set the table to echo the indicated stream back to the receiver. No support from the network or network access signaling protocols is required for this mechanism to be effective but it would be prudent to notify the network signaling system that link resources have been utilized in this manner. Given the state of current signaling protocols, it is not yet possible to know if this type of cooperation is possible.

Changes in the A-TAP architecture are not required for this feature to be supported. If the host controlling the A-TAP ring is utilizing a bi-directional UNI VPI/VCI assignment, then the A-TAP devices can be unset for Tree Disable (thus allowing A-TAP control cells to be sent upstream towards the network). This would allow the receiving device to send one A-TAP control cell to update his own table and then have a copy of the cell sent upstream to the loopback A-TAP. The loopback A-TAP's RS&E will route the cell to the device side which will send it to the CE subsystem input port. The CE subsystem will then send the A-TAP control cell to the loopback VPXT/VCXT and set the channel for R&SE routing.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. An asymmetrical, three port interface device to be connected to an ATM switch in an ATM network, said ATM switch having a plurality of ports, each of said ATM switch ports having means for transmitting and receiving ATM data cells within a predetermined bandwidth, said interface device having a first port for connection to one of said ATM switch ports, and two other ports, said interface device including a multiplexer and a routing and switching element connected between said interface device ports for transmitting and receiving ATM data cells between said first port and each of said two other ports at ATM network transmission rates so that a plurality of ATM devices, upon connection to said other ports, have access to said ATM network through said interface device and said one ATM switch port by sharing the bandwidth of said one ATM switch port.

2. The interface device of claim 1 wherein said interface device is adapted for interconnecting with another interface device so that a plurality of said interface devices, upon interconnection, permit a greater plurality of ATM devices to have access to said one ATM switch port.

3. The interface device of claim 2 wherein said interface device is connectable for re-circulating ATM data cells input through one of its ports back out of said interface device through said one of its ports to echo back a transmission of ATM data cells prior to their being transmitted through the ATM switch.

4. The interface device of claim 2 wherein said interface device is adapted for connection to a computer subsystem so that a plurality of interconnected interface devices, upon connection to a plurality of computer subsystems, provide a functional replacement for a backplane bus otherwise used to interconnect said computer subsystems.

5. The interface of claim 4 wherein said computer subsystem includes a CPU and a closely coupled memory, said CPU and memory having a bus interconnecting them to provide for direct data transfer therebetween, said interface device being adapted for connection to said direct data transfer bus so that, when so connected, said direct data transfer is not transmitted through any interface device.

6. The interface device of claim 1 wherein said multiplexer is adapted for multiplexing together all ATM data cells returning to said one ATM switch port.

7. The interface device of claim 6 wherein said routing and switching element is adapted for routing ATM data cells received by said interface device from said one ATM switch port to said interface device other ports.

8. The interface device of claim 7 wherein said routing and switching element is adapted for storing routing information, said routing information determining which of said other ports an ATM data cell is routed to.

9. The interface device of claim 8 further comprising a control element connected with at least one of said interface device ports and said routing and switching element, said control element receiving ATM control cells containing routing data from said at least one interface device port and routing said ATM control cells to the routing and switching element, said routing and switching element updating said routing information stored therein in response to receiving said ATM control cells.

10. The interface device of claim 9 wherein said control element is connected to said multiplexer and routes said ATM control cells thereto, said multiplexer including a disable input for preventing said multiplexer from transmitting said ATM control cells to said first port.

11. The interface device of claim 9 wherein said first port is a switch side port adapted for connection to said one ATM switch port, one of said other ports being a device side port adapted for connection either to an ATM device or the switch side port of another interface device, and the other of said other ports being an extension side port adapted for connection either to an ATM device or the switch side port of another interface device.

12. The interface device of claim 11 wherein said switch side port is also adapted for connection either to an ATM device or the switch side port of another interface device, said extension side port is also adapted for connection to said one ATM switch port, and said device side port has its input connected to its output, said interface device thus connected providing means for echoing back ATM data cells to any ATM device connected thereto.

13. The interface device of claim 1 wherein each of said interface device ports includes an upstream port and a downstream port, each of said upstream ports and downstream ports providing a separate physical connection.

14. The interface device of claim 13 wherein said multiplexer is connected between said upstream ports for multiplexing together all ATM data cells returning to said one ATM switch port.

15. The interface device of claim 14 wherein said routing and switching element is connected between said downstream ports for storing ATM data cell routing information, said routing information determining which of said interface device other ports each of said ATM data cells is routed to.

16. The interface device of claim 15 further comprising a control element connected between at least one of said upstream ports, said multiplexer, and said routing and switching element, said control element receiving ATM control cells containing routing data from said upstream port and routing said control cells to the routing and switching element, said routing and switching element updating said routing information stored therein in response to receiving said control cells.

17. The interface device of claim 16 wherein said control element routes said ATM control cells to said multiplexer and said multiplexer includes a disable input for preventing said multiplexer from transmitting said ATM control cells to said first port.

18. A three port interface device to be connected to an ATM switch in an ATM network, said ATM switch having a plurality of ports, each of said ATM switch ports having means for transmitting and receiving ATM data cells within a predetermined bandwidth, said interface device having a first port for connection to one of said ATM switch ports, and only two other ports, said interface device including a multiplexer and a routing and switching element connected between said interface device ports for transmitting and receiving ATM data cells between said first port and each of said two other ports at ATM network transmission rates so that a plurality of ATM devices, upon connection to said other ports, have access to said ATM network through said interface device and said one ATM switch port by sharing the bandwidth of said one ATM switch port.

19. The interface device of claim 18 wherein said multiplexer is adapted for multiplexing together all ATM data cells returning to said one ATM switch port.

20. The interface device of claim 19 wherein said routing and switching element is adapted for routing ATM data cells received by said interface device from said one ATM switch port to said interface device other ports based on routing information stored in said ATM data cells.

21. The interface device of claim 20 wherein said interface device is asymmetrical.

22. An asymmetrical, three port interconnection device having three ports for transmitting ATM data cells at ATM data rates between said ports, said interconnection device including a multiplexer connected between said ports for multiplexing ATM data cells input to said interconnection device through two of its ports and transmitting said multiplexed ATM data cells through the third one of said interconnection device ports, and a routing and switching element connected between said ports for directing ATM data cells input to said interconnection device through said third port for output through said two of its ports based on routing information stored in said ATM data cells, wherein at least one of said ports is incapable of receiving data cells from and transmitting data cells to another one of said ports.

23. The interconnection device of claim 22 further comprising a control element connected to said multiplexer and at least one of said interconnection device ports, said control element receiving ATM control cells and routing them to each of said multiplexer and said routing and switching element.

24. The interconnection device of claim 23 wherein each of said interconnection device ports includes an upstream connector and a downstream connector, said upstream connectors being interconnected with said multiplexer to provide an output of a single stream of said multiplexed ATM data cells through the upstream connector of said third port, said downstream connectors being interconnected with said routing and switching element to provide an output at the downstream connectors of said two of its ports for a single stream of incoming multiplexed ATM data cells.

25. An interface device for an ATM network, said ATM network having a plurality of ports, each of said ports having means for transmitting and receiving ATM data cells, said interface device having a first port for connection to one of said ATM network ports, and at least two other ports, each of said two other ports including an upstream port and a downstream port, each of said upstream ports and downstream ports providing a separate physical connection, said interface device having a multiplexer and a routing and switching element for transmitting and receiving ATM data cells between said first port and each of said other ports at ATM network transmission rates so that an ATM device upon connection to either of said other ports has access to said ATM network through-said interface device and said one ATM network port, said routing and switching element routing ATM data cells between said ports based on routing information stored in said ATM data cells.

26. The interface device of claim 25 wherein said multiplexer is connected between said upstream ports for multiplexing together all ATM data cells returning to said one ATM switch port.

27. The interface device of claim 26 wherein said routing and switching element is connected between said downstream ports for storing ATM data cell routing information, said routing information determining which of said interface device other ports each of said ATM data cells is routed to.

28. The interface device of claim 27 further comprising a control element connected between at least one of said upstream ports, said multiplexer, and said routing and switching element, said control element receiving ATM control cells containing routing data from said upstream port and routing said control cells to the routing and switching element, said routing and switching element updating said routing information stored therein in response to receiving said control cells.

29. The interface device of claim 28 wherein said control element routes said ATM control cells to said multiplexer and said multiplexer includes a disable input for preventing said multiplexer from transmitting ATM control cells to said first port.

* * * * *